United States Patent
Sammoura et al.

(10) Patent No.: US 11,928,795 B2
(45) Date of Patent: Mar. 12, 2024

(54) FILTERING PULSE-WIDTH MODULATED (PWM) NOISE FROM A FINGERPRINT IMAGE CAPTURED WITH AN OPTICAL UNDER-DISPLAY FINGERPRINT SENSOR (UDFPS)

(71) Applicant: Google LLC, Mountain View, CA (US)

(72) Inventors: Firas Sammoura, Dublin, CA (US); Omar Sze Leung, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/769,193

(22) PCT Filed: Oct. 29, 2021

(86) PCT No.: PCT/US2021/057320
§ 371 (c)(1),
(2) Date: Apr. 14, 2022

(87) PCT Pub. No.: WO2022/186863
PCT Pub. Date: Sep. 9, 2022

(65) Prior Publication Data
US 2023/0139382 A1 May 4, 2023

Related U.S. Application Data

(60) Provisional application No. 63/156,306, filed on Mar. 3, 2021.

(51) Int. Cl.
*G06V 40/13* (2022.01)
*G06F 21/31* (2013.01)
(Continued)

(52) U.S. Cl.
CPC .............. *G06T 5/002* (2013.01); *G06F 21/31* (2013.01); *G06T 7/0002* (2013.01);
(Continued)

(58) Field of Classification Search
None
See application file for complete search history.

(56) References Cited

U.S. PATENT DOCUMENTS 9,299,282 B2 3/2016 Oh et al.
9,697,758 B2 7/2017 Watanabe et al.
(Continued)

FOREIGN PATENT DOCUMENTS

| CN | 112331145 | 2/2021 |
|---|---|---|
| CN | 113053306 | 6/2021 |

(Continued)

OTHER PUBLICATIONS

"Foreign Office Action", EP Application No. 21811202.7, dated Mar. 17, 2023, 6 pages.
(Continued)

*Primary Examiner* — Joseph R Haley
(74) *Attorney, Agent, or Firm* — Colby Nipper PLLC (57) ABSTRACT

This disclosure describes methods, apparatuses, and techniques for capturing a fingerprint image using an electronic device with an under-display fingerprint sensor (UDFPS) embedded under a display screen of a display system. The display system utilizes a pulse-width modulation circuit to generate a pulse-width modulated (PWM) signal to control light emitted by the display screen. As the display screen illuminates a user's touch, the UDFPS captures light reflected off the user's touch, therefore, capturing the fingerprint image. The captured fingerprint image, however, includes a PWM noise. The electronic device uses a noise-filtering algorithm to filter out and/or reduce the PWM noise in the captured fingerprint image. In one aspect, the noise-filtering algorithm estimates and/or determines the PWM noise in the captured fingerprint image. The noise-filtering
(Continued)

algorithm then reduces, extracts, and/or filters out the PWM noise from the captured fingerprint image.

20 Claims, 6 Drawing Sheets

(51) Int. Cl.
*G06T 5/00* (2006.01)
*G06T 7/00* (2017.01)

(52) U.S. Cl.
CPC ............... *G06V 40/1318* (2022.01); *G06T 2207/20182* (2013.01); *G06T 2207/30168* (2013.01)

(56) References Cited

U.S. PATENT DOCUMENTS

| | | | |
|---|---|---|---|
| 10,510,317 | B2 | 12/2019 | Spence et al. |
| 10,885,852 | B2 | 1/2021 | Zhang et al. |
| 11,403,984 | B2 | 8/2022 | Jung et al. |
| 11,842,678 | B2 | 12/2023 | Wen et al. |
| 2004/0001076 | A1 | 1/2004 | Leng et al. |
| 2009/0303161 | A1 | 12/2009 | Messmer et al. |
| 2010/0302268 | A1 | 12/2010 | Jun et al. |
| 2014/0009408 | A1* | 1/2014 | Lee .................. G06F 3/041 345/173 |
| 2014/0092061 | A1* | 4/2014 | Akai .................. G06F 3/04182 345/174 |
| 2015/0287352 | A1 | 10/2015 | Watanabe et al. |
| 2016/0078838 | A1 | 3/2016 | Huang et al. |
| 2016/0078846 | A1 | 3/2016 | Liu et al. |
| 2017/0092196 | A1 | 3/2017 | Gupta et al. |
| 2017/0147865 | A1 | 5/2017 | Jensen et al. |
| 2017/0344846 | A1 | 11/2017 | Yoshida |
| 2018/0121703 | A1 | 5/2018 | Jung et al. |
| 2018/0151109 | A1 | 5/2018 | Shim et al. |
| 2018/0199014 | A1 | 7/2018 | Morgan et al. |
| 2018/0268780 | A1 | 9/2018 | Bae et al. |
| 2018/0293419 | A1 | 10/2018 | Yan |
| 2018/0301080 | A1 | 10/2018 | Shigeta et al. |
| 2021/0012749 | A1 | 1/2021 | Furihata et al. |
| 2021/0049966 | A1 | 2/2021 | Hsu et al. |
| 2021/0183290 | A1 | 6/2021 | Sato et al. |
| 2021/0201731 | A1 | 7/2021 | Ranjan et al. |
| 2021/0201738 | A1 | 7/2021 | Song et al. |
| 2022/0044629 | A1 | 2/2022 | Wen et al. |
| 2022/0114956 | A1 | 4/2022 | Lee et al. |
| 2022/0130308 | A1 | 4/2022 | Jung et al. |

FOREIGN PATENT DOCUMENTS

| | | |
|---|---|---|
| KR | 102279278 | 7/2016 |
| KR | 20160080768 | 7/2016 |
| KR | 20210004007 | 1/2021 |
| WO | 2022105484 | 5/2022 |

OTHER PUBLICATIONS

"Non-Final Office Action", U.S. Appl. No. 17/500,811, dated Feb. 22, 2023, 15 pages.

Choi, et al., "Disabling Transitions When Encoded Intensity is Low", Application No. PCT/US2021/070522, filed May 10, 2021, 46 pages.

Shin, et al., "Dynamic Voltage Scaling of OLED Displays", Jun. 2011, 6 pages.

Wen, et al., "Smooth Brightness Transition for Computing Devices", Technical Disclosure Commons, https://www.tdcommons.org/dpubs_series/3021, Mar. 16, 2020, 9 pages.

Yonebayashi, et al., "High refresh rate and low power consumption AMOLED panel using top-gate n-oxide and p-LTPS TFTs", Mar. 2020, 10 pages.

Karri, et al., "User Interface Mitigation of Display Artifacts During Transitions between Display Clock Speeds", Technical Disclosure Commons, https://www.tdcommons.org/dpubs_series/5427, Nov. 4, 2022, 7 pages.

"International Search Report and Written Opinion", Application No. PCT/US2021/057320, dated Feb. 16, 2022, 11 pages.

"International Preliminary Report on Patentability", Application No. PCT/US2021/057320, dated Aug. 29, 2023, 8 pages.

"Notice of Allowance", U.S. Appl. No. 17/500,811, dated Jul. 26, 2023, 9 pages.

\* cited by examiner

FILTERING PULSE-WIDTH MODULATED (PWM) NOISE FROM A FINGERPRINT IMAGE CAPTURED WITH AN OPTICAL UNDER-DISPLAY FINGERPRINT SENSOR (UDFPS)

RELATED APPLICATION(S)

This application is a national stage entry of International Application No. PCT/US2021/057320, filed Oct. 29, 2021, which claims the benefit of U.S. Provisional Application No. 63/156,306, filed Mar. 3, 2021, the disclosures which are incorporated herein by reference in their entirety.

BACKGROUND

To preserve space on a display side of an electronic device, a manufacturer may embed sensors under the display. These sensors can include an optical under-display fingerprint sensor (UDFPS), an ambient light sensor, a camera, and so forth. For the optical UDFPS, as a user places a finger on the display and over the optical UDFPS, the electronic device uses the brightness of the display to illuminate the finger. Example illumination systems use a pulse-width modulation circuit to enable the electronic device to generate a pulse-width modulated (PWM) signal to control a brightness, a refresh rate, and so forth, by which to illuminate the finger. Unfortunately, the optical UDFPS may capture a fingerprint image that includes PWM noise. The PWM noise increases a temporal noise and may reduce a signal-to-noise ratio of the captured fingerprint image. The reduced signal-to-noise ratio of the captured fingerprint image lowers the fingerprint image's quality. A fingerprint with a lower image quality may increase a false acceptance rate, consequently compromising a biometric security of the electronic device. The fingerprint with a lower image quality may also increase a false rejection rate, thereby providing a poor user experience.

SUMMARY

This disclosure describes methods, apparatuses, and techniques for capturing a fingerprint image using an electronic device with an under-display fingerprint sensor (UDFPS) embedded under a display screen of a display system. The display system utilizes a pulse-width modulation circuit to generate a pulse-width modulated (PWM) signal to control light emitted by the display screen. As the display screen illuminates a user's touch, the UDFPS captures light reflected off the user's touch, therefore, capturing the fingerprint image. The captured fingerprint image, however, includes a PWM noise. The electronic device uses a noise-filtering algorithm to filter out and/or reduce the PWM noise in the captured fingerprint image. In one aspect, the noise-filtering algorithm estimates and/or determines the PWM noise in the captured fingerprint image. The noise-filtering algorithm then reduces, extracts, and/or filters out the PWM noise from the captured fingerprint image. The noise-filtering algorithm can use limited hardware and/or memory resources and may utilize relatively-few computational resources.

In one aspect, a computer-implemented method is described that performs a principal component analysis on background images associated with a sensor embedded under a display screen of a display system, the principal component analysis providing an artifact on the background images. The method then extracts principal component vectors from the artifact and, responsive to the extracting and based on the principal component vectors, determines at least one pulse-width modulated (PWM) noise. Responsive to determination of the PWM noise, the method vectorizes the PWM noise to create a PWM noise vector and illuminates, with light from the display screen, a user touch. Illuminating the user touch causes the light to reflect off a user's skin. The method then captures the reflected light at the sensor to provide a user-associated image and projects the user-associated image onto a vector space, the vector space being associated with the PWM noise vector to provide the user-associated image on the vector space. Based on the user-associated image on the vector space, the method filters out the PWM noise from the user-associated image to provide a reduced-noise image.

In another aspect, an electronic device includes a display screen of a display system, a pulse-width modulation circuit of the display system, a sensor, one or more processors, and one or more computer-readable media having instructions thereon that, responsive to execution by the one or more processors, perform the operations of the method mentioned above. In yet other aspects, a system, a software, or means includes performing the operations of the method mentioned above.

This summary introduces simplified concepts for capturing a fingerprint with fingerprint sensors, which is further described below in the Detailed Description and Drawings. For ease of description, the disclosure focuses on optical UDFPSs embedded under a display screen (e.g., an organic light-emitting diode (OLED) display) of an electronic device. The described concepts, however, may be utilized in numerous software, systems, and/or apparatuses to filter out, extract, and/or reduce noise associated with a pulse-width modulated signal. Optional features of one aspect, such as the method described above, may be combined with other aspects.

BRIEF DESCRIPTION OF THE DRAWINGS

The details of one or more aspects of user devices with fingerprint identification systems that increase a quality of a fingerprint image by extracting a pulse-width modulated noise from the fingerprint image are illustrated in the following figures.

DETAILED DESCRIPTION

Example Environments

Figure 1:
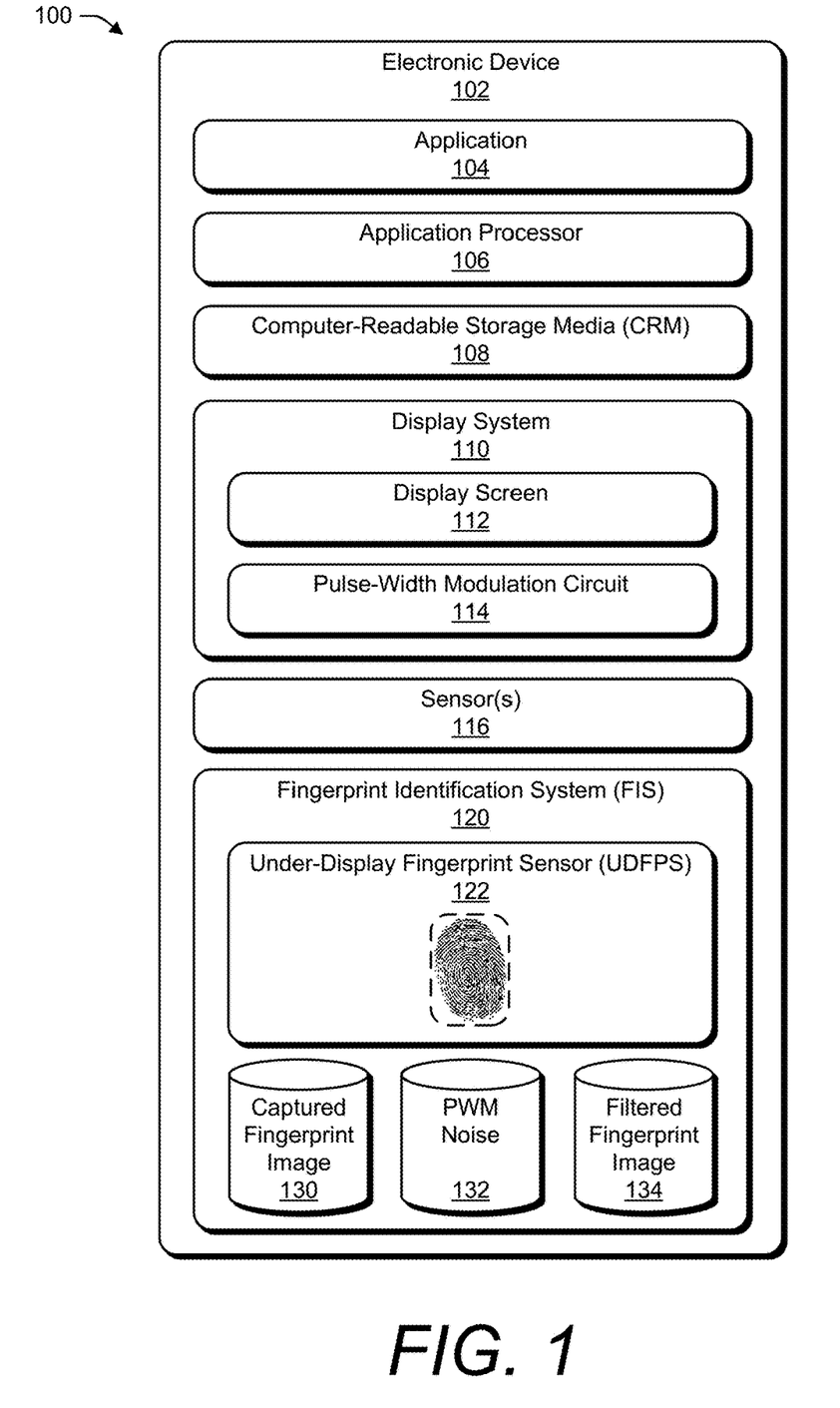
FIG. 1 illustrates an example electronic device with a fingerprint identification system having a fingerprint sensor embedded under a display screen of a display system.
Figure 6:
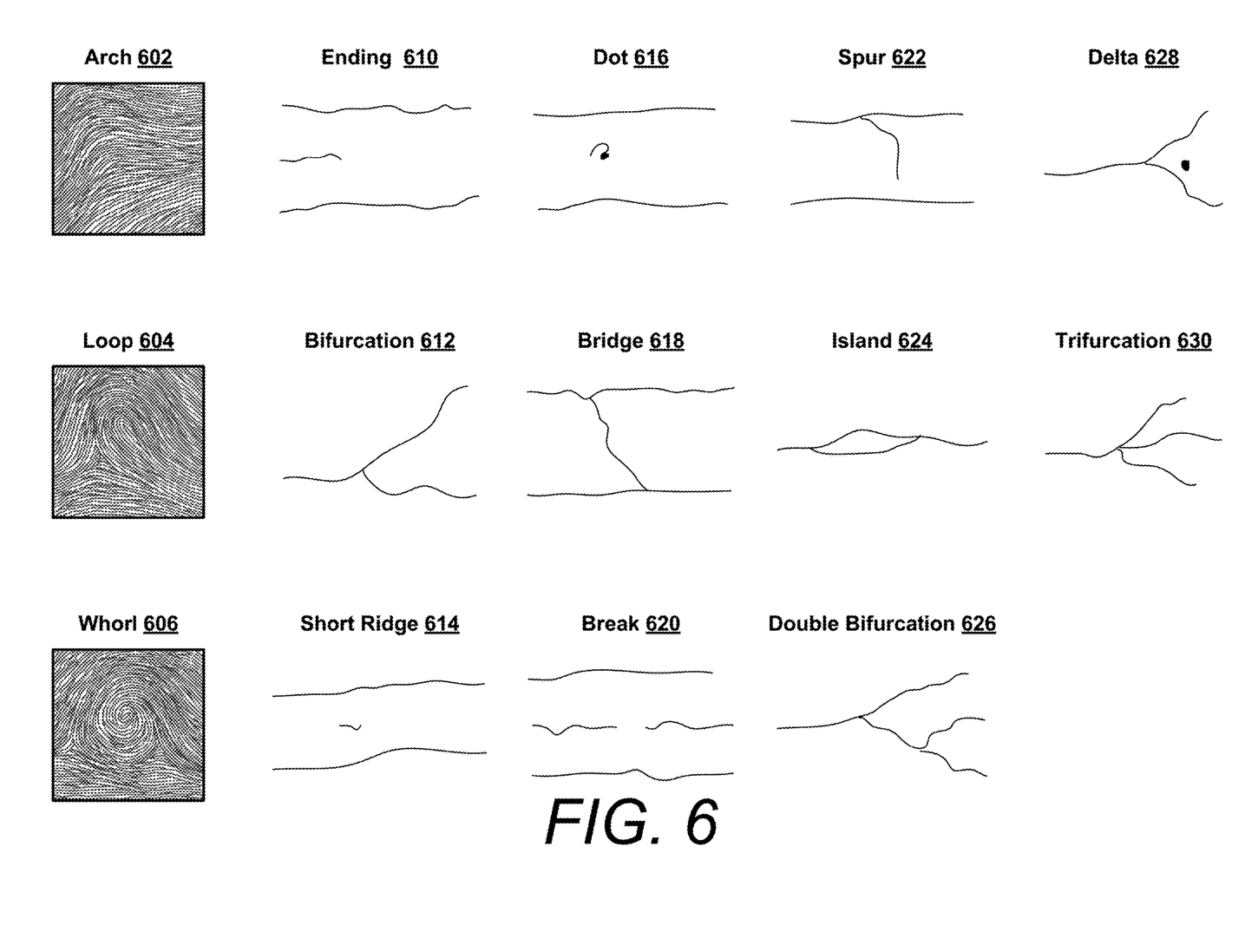
FIG. 6 illustrates examples of patterns and minutiae used in fingerprint authentication.

FIG. 1 illustrates an example environment 100 of an electronic device 102. The electronic device 102 enables a user to biometrically secure their device using a fingerprint identification system 120 (FIS 120) with at least one optical under-display fingerprint sensor 122 (UDFPS 122). The electronic device 102 can provide biometric security by comparing a verify image to an enrolled image of the user's thumb, fingertip, or plurality of fingertips. For example, the electronic device 102 can utilize the UDFPS 122 to capture a "verify image" and match patterns and/or minutiae of the verify image to an "enrolled image," where examples of patterns and minutiae are illustrated in FIG. 6.

As described herein, a "verify image" is a fingerprint image used for authentication. An "enrolled image" is an image that the user device captures during enrollment, such as when the user first sets up the electronic device 102 or an application 104. Further, an "enrolled image template" (an enrolled template) can be a mathematical representation of the enrolled image. The enrolled template can be a vectorized representation of the enrolled image and, among other advantages noted below, take less memory space in the user device. While beneficial in some respects, the use of a vectorized representation for an enrolled image template is not required for matching a verify image to the enrolled image template. The described apparatuses, methods, and techniques can perform image-to-image (rather than vector-to-vector) comparisons, as well as other representations, to compare each verify image to the enrolled image.

The electronic device 102 may be a smartphone, a tablet, a laptop, a desktop computer, a computing watch, computing eyeglasses, a gaming system or controller, a smart speaker system, an appliance, a television, an entertainment system, an audio system, an automobile, an unmanned vehicles (in-air, on the ground, or submersible "drones"), a trackpad, a drawing pad, a netbook, an e-reader, a home security system, a doorbell, a refrigerator, and other devices with a fingerprint identification system 120.

The electronic device 102 may include additional or fewer components than what is illustrated in FIG. 1. The electronic device 102 includes one or more application processor(s) 106 and one or more computer-readable storage media (CRM 108). The application processor 106 may include any combination of one or more controllers, microcontrollers, processors, microprocessors, hardware processors, hardware processing units, digital signal processors, graphics processors, graphics processing units, and the like. The application processor 106 processes computer-executable instructions (e.g., code, MATLAB® code) stored by the CRM 108. The CRM 108 may include any suitable memory media and storage media, for example, volatile memory (e.g., random-access memory (RAM)), non-volatile memory (e.g., Flash memory), optical media, magnetic media (e.g., disk or tape), and so forth. Also, the CRM 108 may store instructions, data (e.g., biometric data), and/or other information, and the CRM 108 excludes propagating signals.

The electronic device 102 may also include an application 104. The application 104 may be a software, applet, peripheral, or other entity that requires or favors authentication of a verified user. For example, the application 104 can be a secured component of the electronic device 102 or an access entity to secure information accessible from the electronic device 102. The application 104 can be an online banking application software or webpage that requires fingerprint identification before logging in to an account. Alternatively, the application 104 may be part of an operating system (OS) that prevents access (generally) to the electronic device 102 until the user's fingerprint is authenticated as the verified user's fingerprint. The verified user may execute the application 104 partially or wholly on the electronic device 102 or in "the cloud" (e.g., on a remote device accessed through the Internet). For example, the application 104 may provide an interface to an online account using an internet browser and/or an application programming interface (API).

Further, the electronic device 102 may also include one or more input/output (I/O) ports (not illustrated) and a display system 110. The display system 110 includes at least one display screen 112, for example, an organic light-emitting diode (OLED) display screen. The display system also includes a pulse-width modulation circuit 114, which may be part of a driver (not illustrated in FIG. 1) associated with the display screen 112. The pulse-width modulation circuit 114 can generate a pulse-width modulated (PWM) signal that enables the electronic device 102 to control a brightness, a refresh rate, and so forth, of the display screen 112.

To preserve space on a display side of an electronic device 102, a manufacturer may embed sensor(s) 116 (e.g., an ambient light sensor, a camera) and the UDFPS 122 under the display screen 112. The sensor 116 and the UDFPS 122, however, may favor different brightness of the display screen 112 and/or different duty cycles of the PWM signal. For example, an ambient light sensor may operate better when the PWM signal has a higher pixel off-time, or as may be referred herein, a "blanking time." On the other hand, the UDFPS 122 may operate better when the PWM signal has a lower blanking time. To accommodate these different requirements, the PWM signal has a duty cycle of less than one hundred percent (100%). In addition, a user may favor a display screen 112 that has a high refresh rate (e.g., 360 Hertz (Hz)). Often, a higher refresh rate can support a higher image quality (e.g., text, still picture, video) on the display screen 112. In aspects, the UDFPS 122 may be calibrated to accommodate multiple modes of operation encompassing varying duty cycles or varying frequency of a PWM noise 132 (e.g., see FIGS. 2 and 3).

In one aspect, the blanking time of the PWM signal and the refresh rate of the display screen 112 may cause the UDFPS 122 to capture a fingerprint image 130 that includes a PWM noise 132, as is further described below. The PWM noise 132 increases a temporal noise and reduces a signal-to-noise ratio (SNR) of the captured fingerprint image 130. The reduced SNR and a presence of the PWM noise 132 on the captured fingerprint image 130 lower a quality of the fingerprint image, adversely affecting biometric security. In biometric security, a success rate is often characterized using a receiver operating curve (ROC), which can be represented as a graphical plot illustrating the diagnostic ability of a binary classifier system as its discrimination threshold is varied. More specifically, biometric security measurements may include a false acceptance rate (FAR) for a proportion of times a fingerprint identification system grants access to an unauthorized person and a false rejection rate (FRR) for a proportion of times a fingerprint identification system fails to grant access to an authorized person. Qualitatively speaking, a fingerprint identification system with a high success rate has a low false acceptance rate and a low false rejection rate.

To increase the success rate of the fingerprint identification system 120, the electronic device 102 can remove and/or filter out the PWM noise 132 from the captured fingerprint image 130 to generate, store, and use a filtered fingerprint image 134. The filtered fingerprint image 134 has an increased SNR, less PWM noise 132, a lower FAR, a lower FRR, and offers better biometric security than the captured fingerprint image 130. Therefore, the filtered fingerprint image 134 enables the user to better secure the electronic device 102, the application 104, a function, or peripheral thereof.

It is to be understood that the user has control over their biometric data (e.g., fingerprints) because the electronic device 102 may capture, collect, store, analyze, filter, and/or process the information associated with the user after the electronic device 102 receives explicit permission from the user. In fact, throughout the disclosure, examples are described where the electronic device 102 analyzes information (e.g., captured fingerprint image) associated with the user. In situations discussed below in which the electronic device 102 authenticates a user based on fingerprints, the user can be provided with an opportunity to control whether programs or features of the user device or a remote system can collect and make use of the fingerprint for a current or subsequent authentication procedure. Individual users, therefore, have control over what the electronic device 102 can or cannot do with fingerprint images and other information associated with the user. Information associated with the user (e.g., an enrolled image, a verify image, a captured fingerprint image), if ever stored, is pre-treated in one or more ways so that personally identifiable information is removed before being transferred, stored, or otherwise used. For example, before a user device stores an enrolled image, the user device may encrypt the enrolled image. Pre-treating the data this way ensures the information cannot be traced back to the user, thereby removing any personally identifiable information that would otherwise be inferable from the fingerprint of the user. Alternatively, the user may elect to forgo securing the electronic device 102 using biometric data. Instead, the user may employ a username, a password, a personal identification number (PIN), and/or a combination thereof to secure their electronic device 102 and/or the application 104.

PWM Noise

Figure 2:
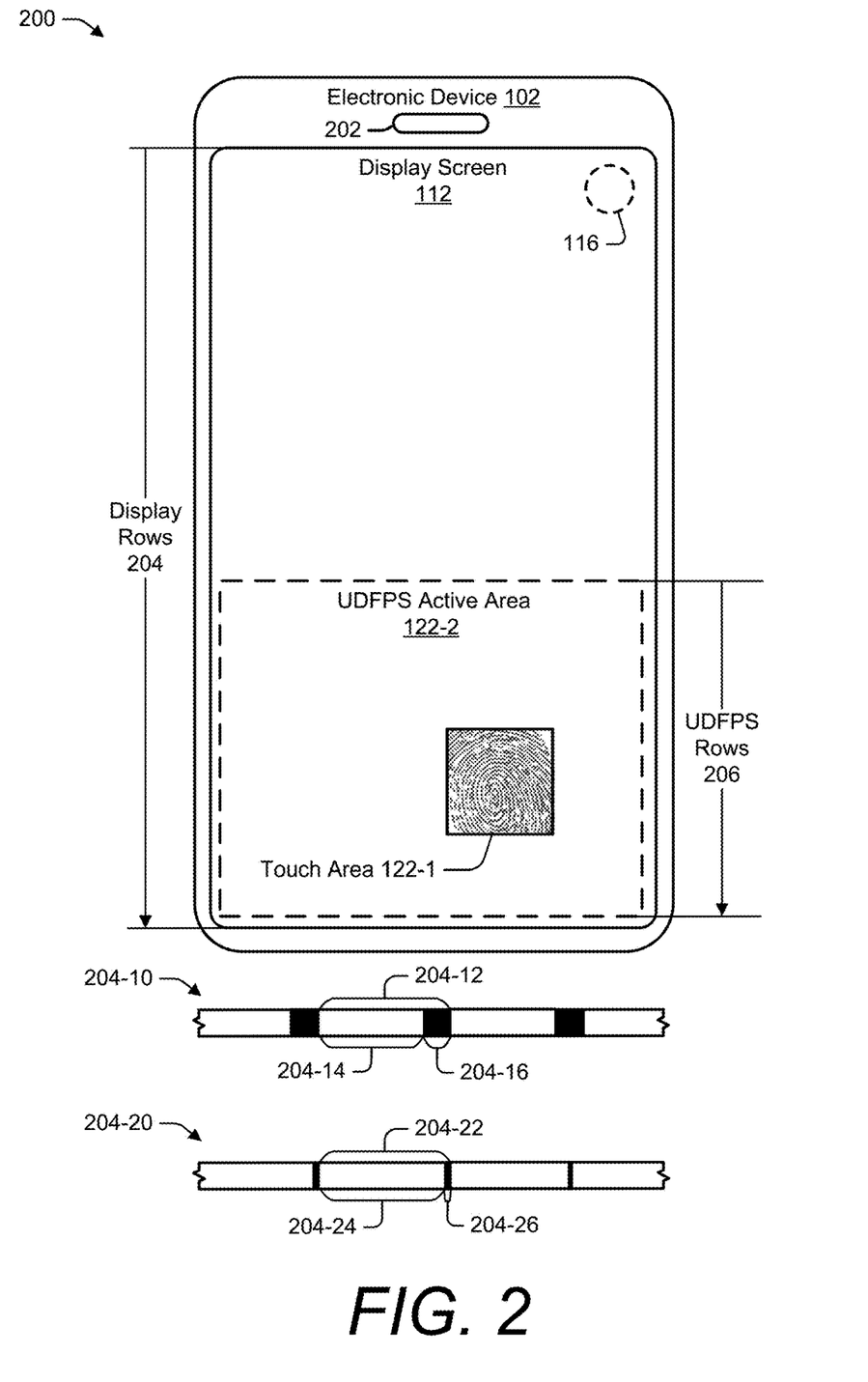
FIG. 2 illustrates example causes of a pulse-width modulated (PWM) noise in a captured fingerprint image.

FIG. 2 illustrates an environment 200 of a display side of an electronic device 102 (e.g., a smartphone). FIG. 2 helps describe some example causes of the PWM noise 132 in a captured fingerprint image 130. As is illustrated, the electronic device 102 may include a speaker 202 and a display screen 112. To preserve space on a display side of the electronic device 102, a manufacturer may embed the sensor 116 and the UDFPS 122 under the display screen 112. In FIG. 2, electronic components that are embedded under the display screen 112 are illustrated with dashed lines.

In one aspect, the driver and/or the pulse-width modulation circuit 114 drives pixels of the display screen 112 using a display "rolling shutter" scheme, where consecutive rows of the pixels 204 (display rows 204) are refreshed at a certain frequency (e.g., 60 Hz, 90 Hz, 360 Hz). As described herein, a "rolling shutter" scheme is a method to capture and/or display an image in which a still picture or each frame of a video is captured and/or displayed by scanning across the image rapidly, vertically (as illustrated in FIG. 2) or horizontally (not illustrated). The "rolling shutter" scheme differs from a "global shutter" scheme (not illustrated); in the "global shutter" scheme, an entire still picture or frame of the video is captured and/or displayed at a same instant. As is illustrated by a direction of an arrow of the display rows 204, the display rolling shutter scheme may be a vertical scheme. Although not illustrated, the display rolling shutter scheme may be a vertical scheme with an opposite direction than what is illustrated in FIG. 2. Alternatively, the display rolling shutter scheme may be a horizontal scheme, where the horizontal scheme may have a left-to-right or right-to-left direction.

In FIG. 2, the PWM signal drives the pixels of the display rows 204 with a duty cycle of less than 100%. As described herein, a "duty cycle" is a fraction of one "period" in which the PWM signal turns on pixels of the display row(s) 204. The period is a time it takes the PWM signal to complete an on-and-off cycle. The duty cycle of the PWM signal may be expressed as a percentage or a ratio. For example, an 80% duty cycle describes a PWM signal that is on 80% of the time and off 20% of the time during each period. Diagrams 204-10 and 204-20 help illustrate a first (204-10) and a second (204-20) PWM signal with respective duty cycles that are less than 100%. For consistency, brevity, and the sake of clarity of this illustration, the PWM signals 204-10 and 204-20 have a same frequency (e.g., 360 Hz)—therefore, a period 204-12 of the first PWM signal 204-10 equals a period 204-22 of the second PWM signal 204-20. Utilizing the display "rolling shutter" scheme, during each period (e.g., 204-12), the first PWM signal 204-10 may turn on pixels of the display row(s) 204 during approximately 80% (e.g., 204-14, on time) of the time, and may turn off pixels of the display row(s) 204 during approximately 20% (e.g., 204-16, blanking time, off time) of the time. Similarly, during each period (e.g., 204-22), the second PWM signal 204-20 may turn on pixels of the display row(s) 204 during approximately 95% (e.g., 204-24) of the time and may turn off pixels of the display row(s) 204 during approximately 5% (e.g., 204-26) of the time. In this illustration, the first PWM signal 204-10 has an 80% duty cycle, and the second PWM signal 204-20 has a 95% duty cycle.

Modulating the duty cycle of the PWM signal (e.g., 204-12, 204-22) modulates and/or controls a brightness output of the pixels of the display screen 112. A shorter blanking time (e.g., 204-26) and a higher refresh rate (e.g., 360 Hz) enable the display screen 112 to display a higher-quality image and with less "flicker." The shorter blanking time (e.g., 204-26), however, impedes the sensor 116 (e.g., the ambient light sensor) from functioning properly because the ambient light sensor benefits from a longer blanking time. Therefore, the display screen 112 and the UDFPS 122 favor a PWM signal with a higher duty cycle (e.g., 204-20), while the sensor 116 favors a PWM signal with a lower duty cycle (e.g., 204-10). Engineers, designers, and scientists strive to design and build an electronic device 102 that can successfully utilize all components, applications, and peripheral thereof. To enable the ambient light sensor to work properly, the electronic device 102 operates with a longer blanking time (e.g., 204-16) of the duty cycle of the PWM signal.

To further describe and illustrate what may cause the PWM noise 132, consider some operation principles of the fingerprint identification system 120 with the UDFPS 122. As the user places their thumb somewhere inside (e.g., touch area 122-1) a UDFPS active area 122-2, the UDFPS 122 captures the fingerprint image 130. In more detail, the display screen 112 illuminates the user's skin touching the display screen 112 (e.g., with visible light). The illumination of the user's touch causes light to reflect off the user's skin (e.g., thumb). The UDFPS 122 captures the reflected light. The UDFPS 122 may utilize various image sensor technologies, such as a complementary metal-oxide-semiconductor (CMOS) image sensor, a charge-coupled device (CCD) image sensor, a thin film transistor (TFT) image sensor, or any image sensor that utilizes light. Assume that the UDFPS 122 includes a CMOS image sensor having some number of pixels (e.g., 2 to 10 megapixels) that are arranged in rows and columns. The UDFPS also uses a UDFPS "rolling shutter" scheme to capture the fingerprint image 130, where consecutive rows of the pixels of the CMOS image sensor (UDFPS rows 206) capture the fingerprint image 130. A time to capture the fingerprint image 130 using the UDFPS "rolling shutter" scheme may be referred to as an "integration time."

The integration time of the fingerprint identification system 120 with the UDFPS 122, however, is appreciatively slower than a refresh time of the display screen 112. The refresh time of the display screen 112 is inversely proportional to the refresh rate of the display screen 112. An illumination of the display screen 112 with a 360-Hz fresh rate may be driven by a PWM signal having a frequency of 360 Hz with an 80% duty cycle. In such a scenario, the PWM signal that controls the illumination of the display screen 112 may include 35 or 36 blanking times during the integration time for capturing the fingerprint image 130.

Engineers, designers, and scientists strive to synchronize a clock (not illustrated) of the fingerprint identification system 120 and a clock (not illustrated) of the display screen 112. In more detail, engineers strive to design a fingerprint identification system 120 with an integration time that is an integer (e.g., a whole number) multiple of the period (e.g., 204-12) and the duty cycle (e.g., 204-14) of the PWM signal. For example, the integration time may be 35 times the period and the duty cycle of the PWM signal. Unfortunately, the respective clocks of the display screen 112 and the fingerprint identification system 120 include respective jitters (e.g., 1%, 2%, 3%) due to process, voltage, and temperate (PVT) variations. In one aspect, the PWM signal may struggle to maintain a constant duty cycle, and/or the fingerprint identification system 120 may struggle to maintain a constant integration time. Consequently, a combination of the shorter duty cycle (longer blanking time) of the PWM signal, the higher refresh rate of the display screen 112, and the jitters of the clocks of the display screen 112 and the fingerprint identification system 120 may cause PWM noise (e.g., 132 of FIG. 1) to appear at a captured fingerprint image (e.g., 130 of FIG. 1). Next, FIG. 3 illustrates an example aspect of the PWM noise 132.

Figure 3:
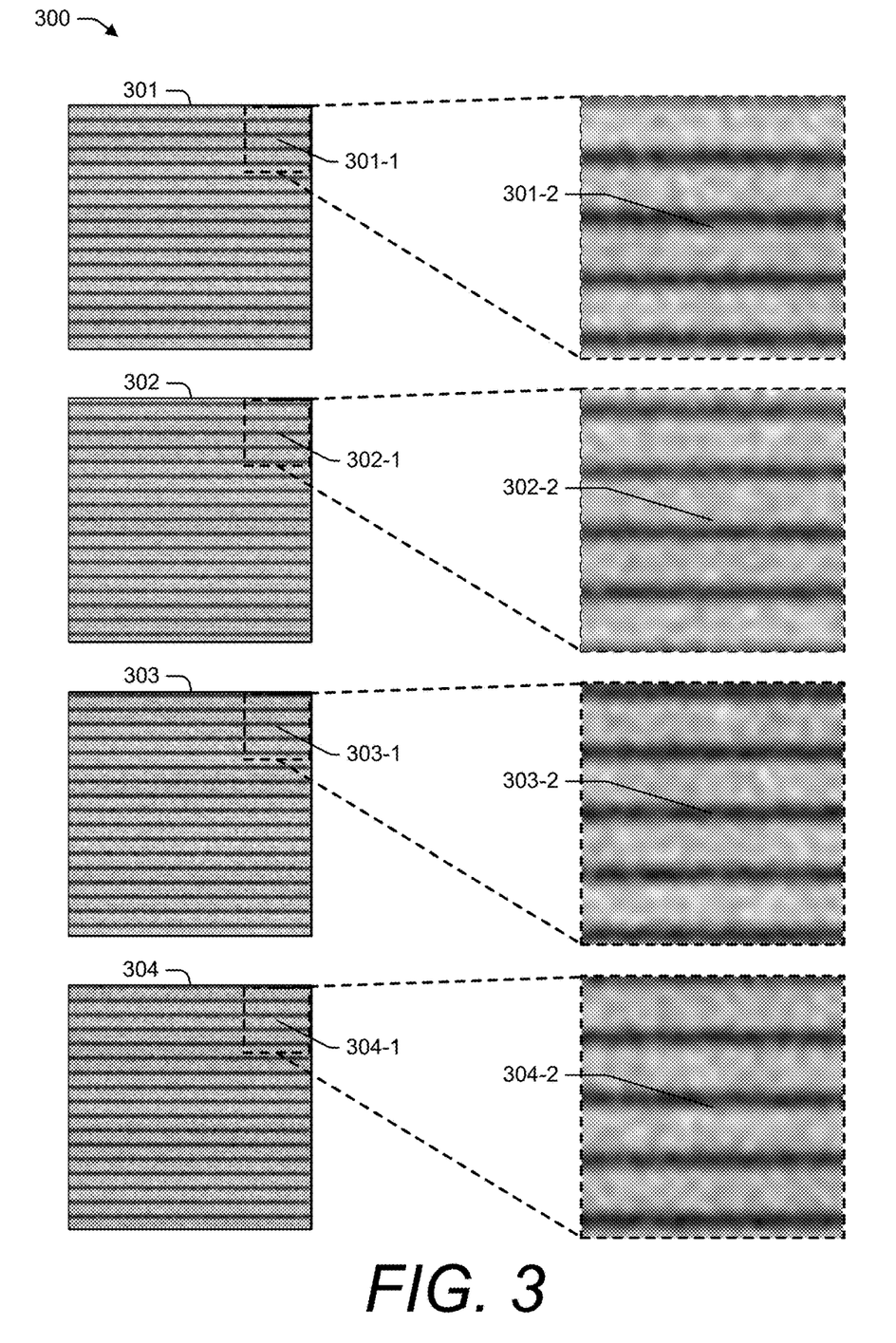
FIG. 3 illustrates examples artifacts that include variations in a phase and a frequency of the PWM noise.

FIG. 3 illustrates an environment 300 of examples of PWM noise 132. In one aspect, to determine the PWM noise 132, the electronic device 102 may capture multiple (e.g., four) consecutive images of a same non-transparent (e.g., white) flat surface that does not include example patterns and/or minutiae of FIG. 6. If the integration time of the fingerprint identification system 120 equals an integer (e.g., 35) multiple of the period (e.g., 204-12) and the duty cycle (e.g., 204-14) of the PWM signal 204-10, the electronic device 102 captures consecutive images that are also flat. FIG. 3, however, illustrates basis 301 to 304 of four consecutively captured images of the flat surface that include dark stripes. These dark stripes are artifacts of the PWM noise 132 because the flat surface does not include stripes.

In addition, a count of dark stripes in the captured images 301 to 304 differs. In one aspect, the different count of the dark stripes in the captured images 301 to 304 may be due to a variation in frequency of the PWM noise 132. To further examine the PWM noise 132, FIG. 3 illustrates enlarged images 301-2 to 304-2 of areas 301-1 to 304-1 of the basis 301 to 304 of the captured images, respectively. The images 301-2, 302-2, 303-2, and 304-2 illustrate variations in a phase of the PWM noise 132. In one aspect, the variations in the phase of the PWM noise may appear as a location shift of the dark stripes in the captured images (e.g., with basis 301 to 304, 301-1 to 304-1, 301-2 to 304-1). Therefore, FIG. 3 helps illustrate that even after a synchronization of clocks of the fingerprint identification system 120 (with the UDFPS 122) and the display system 110 (with the display screen 112), the captured images include PWM noise 132 with variations in phase and in frequency. The variations in phase and frequency of the PWM noise 132 increase an unpredictability of the PWM noise 132. The electronic device 102, however, uses a noise-filtering algorithm to remove and/or filter out the PWM noise 132 from the captured fingerprint image 130 to generate, store, and use the filtered fingerprint image 134. Next, FIG. 4 illustrates how the noise-filtering algorithm may use a principal component analysis (PCA) technique to identify, model, estimate, extract, and/or determine the PWM noise 132.

PWM Noise Estimation

Figure 4:
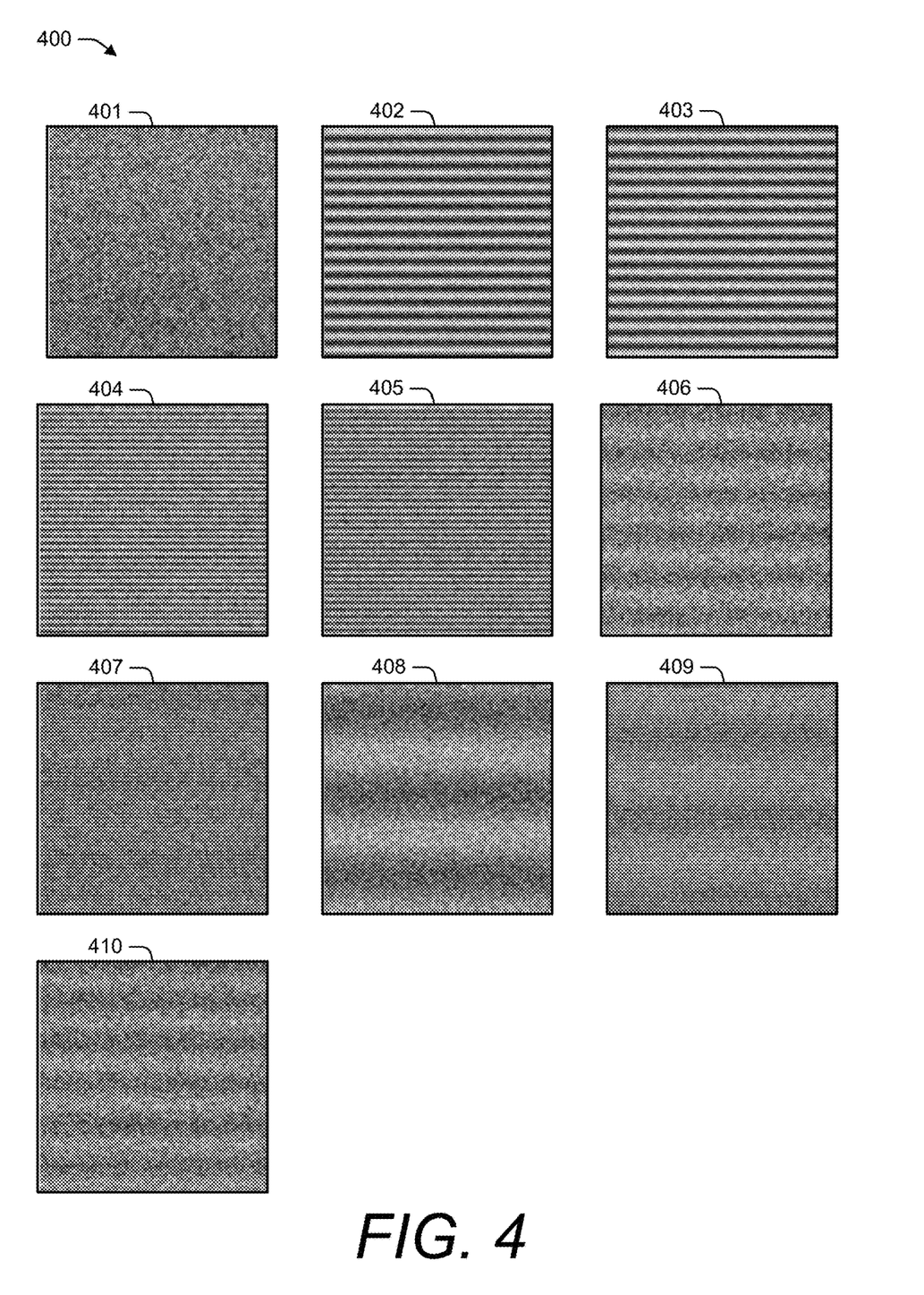
FIG. 4 illustrates various example artifacts due to the PWM noise.

FIG. 4 is an example environment 400 that illustrates basis 401 to 410 of respective captured images of a non-transparent (e.g., white) flat (e.g., smooth) surface. FIG. 4 is described in the context of FIGS. 1 to 3, the electronic device 102, the display system 110 with the display screen 112, and the fingerprint identification system 120 with the UDFPS 122. The captured images of the non-transparent flat surface may be considered and/or referred to as "background images" of the fingerprint identification system 120. Thus, artifacts (e.g., of 401 to 410, patterns, variations in brightness/darkness) that are captured in the background images are due to the PWM noise 132.

The PCA technique can model the PWM noise 132, where the PWM noise 132 may include variations in phase, frequency, and/or amplitude (e.g., brightness or darkness). In mathematics, image processing, signal processing, mechanics, neuroscience, and/or other engineering and science disciplines, the PCA is a technique for computing principal components and/or principal component vectors. As described herein, the PCA technique may be used to identify, model, estimate, extract, and/or determine the artifacts in the background images, as is illustrated in 401 to 410 in FIG. 4. The basis 401-410, identify, model, estimate, extract, and/or determine the PWM noise 132. To reduce the PWM noise 132, the electronic device 102 may synchronize start cycles between the PWM signal used to control light emitted by the display screen 112 and the integration time used to capture the fingerprint image 130 with the UDFPS 122.

In one aspect, to identify, model, estimate, extract, and/or determine the PWM noise 132, the electronic device 102 can capture background images (e.g., with basis 401 to 410) by varying and/or simulating clock jitter, frequency shifts, amplitude variations, and/or other parameters that can induce the PWM noise 132. By so doing, the noise-filtering algorithm may identify, model, estimate, extract, and/or determine the PWM noise 132 in the captured fingerprint image 130 due to respective clock jitters (e.g., 1%, 2%, 3%) of the clock of the FIS 120 and/or the clock of the display system 110. The noise-filtering algorithm can also identify, model, estimate, extract, and/or determine frequency shifts in the PWM noise 132 (e.g., 301-2, 302-2, 303-2, 304-2). The frequency shifts in the PWM noise 132 may occur due to variations of the refresh rate (e.g., 359.6 Hz to 360.4 Hz) of the display screen 112 and/or variations in the integration time (e.g., 97.6 milliseconds to 98.4 milliseconds) using the UDFPS 122. Further, the noise-filtering algorithm can identify, model, estimate, extract, and/or determine amplitude variations due to variations on an amount of light captured by the UDFPS 122 (e.g., UDFPS rows 206). The amplitude variations may occur due to variations of the duty cycle (e.g., 204-14) of the PWM signal (e.g., 204-10) of the display system 110, a mis-synchronization of clocks of the FIS 120 and the display system 110, and/or other factors. The noise-filtering algorithm can use limited hardware and/ or memory resources and may utilize relatively-few computational resources to ensure minimal disruption to the user experience.

Alternatively, or additionally, instead of capturing artifacts on the background images, a manufacturer may use datasheets, specifications, and/or models of the FIS 120 and the display system 110 to calculate potential and/or anticipated artifacts. By so doing, the noise-filtering algorithm may develop a database that includes the PWM noise 132. Thus, the noise-filtering algorithm can identify, model, estimate, extract, and/or determine the PWM noise 132 on an individual electronic device 102, on electronic devices of a same make and model, and/or on a variety of makes and models that share a same display system 110 and a same fingerprint identification system 120. A vectorized form of the background images that include the artifacts (e.g., 401 to 410) may be encrypted and stored on the database. Note that the database that includes the background images with the artifacts does not contain any user biometric data (e.g., fingerprint data). Therefore, the noise-filtering algorithm further protects a user's privacy. Next, FIG. 5 illustrates how the noise-filtering algorithm uses the vectorized form of the background images (e.g., with basis 401 to 410) to filter out the PWM noise 132 from a captured fingerprint image 130 to obtain a filtered fingerprint image 134.

Example Method(s)

Figure 5:
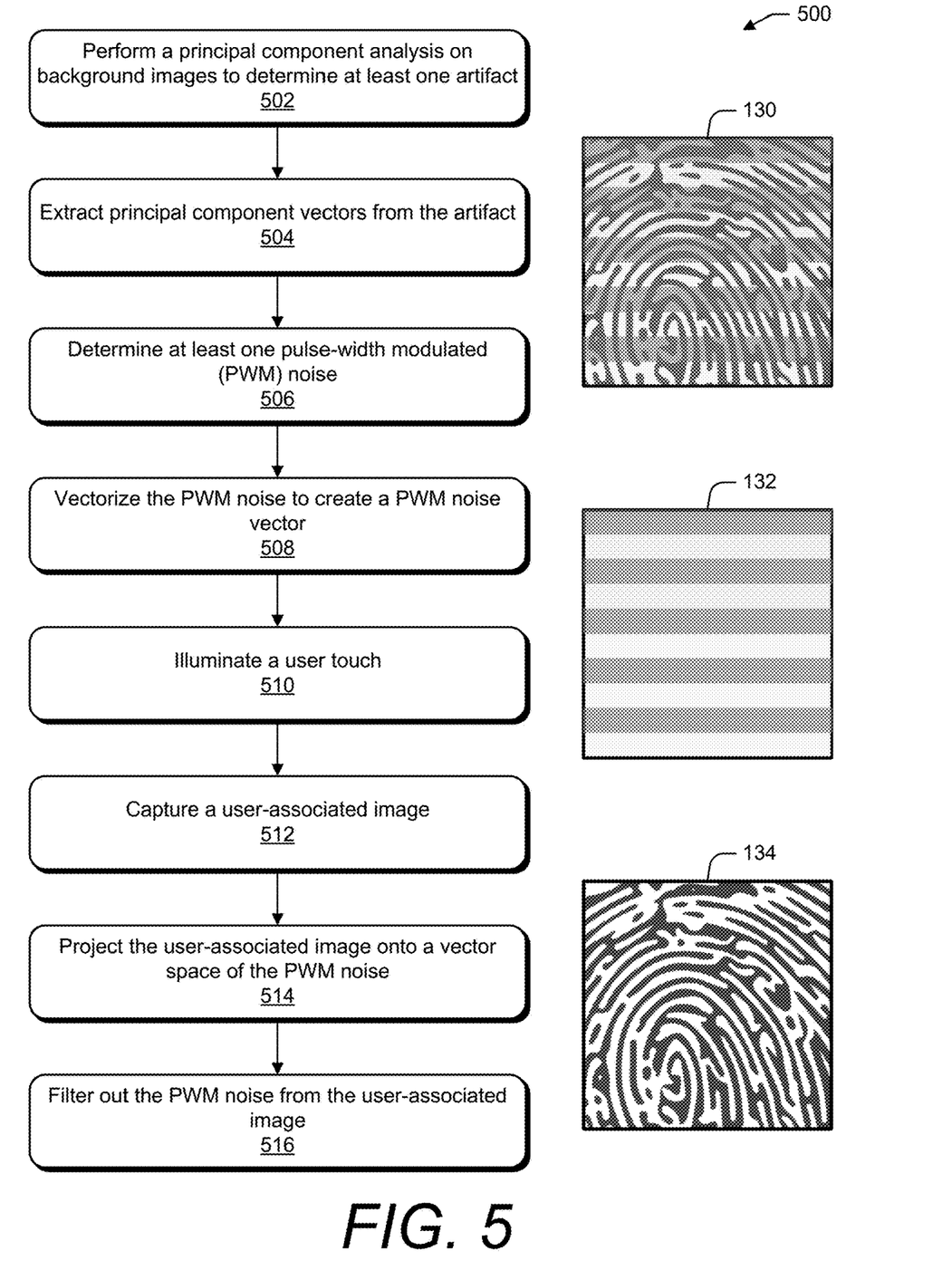
FIG. 5 illustrates an example computer-implemented method for filtering out PWM noise from a captured fingerprint image to provide a filtered fingerprint image with reduced PWM noise.

FIG. 5 illustrates an example method 500 used to filter out the PWM noise 132 from a captured fingerprint image 130 to obtain a filtered fingerprint image 134. FIG. 5 is described in the context of FIGS. 1 to 4, the electronic device 102, the display system 110 with the display screen 112, and the fingerprint identification system 120 with the UDFPS 122. The operations performed in the example method 500 may be performed in a different order or with additional or fewer steps than what is shown in FIG. 5. The PCA technique of example method 500 can model the PWM noise 132, where the PWM noise 132 includes variations in phase, frequency, and/or amplitude (e.g., brightness or darkness). The PCA is a technique for extracting principal components and/or principal component vectors. In aspects, the PCA technique analyzes data (e.g., biometric data) in order to identify, model, estimate, extract, and/or determine the artifacts in the background images.

At stage 502, the method 500 performs a principal component analysis (PCA) on background images (e.g., with basis 401 to 410) using the PCA technique described in FIG. 4. As is illustrated in FIGS. 3, 4, and 5, the background images may include artifacts (e.g., dark stripes). The PCA technique enables the method 500 to identify the artifacts (e.g., 132 of FIG. 5). The method 500 then extracts principal component vectors of the background images at stage 504. As is illustrated in the background images with basis 401 to 410 of FIG. 4, a first plurality of principal components (e.g., 402, 403) may include more artifacts than a second plurality of principal components (e.g., 409). Therefore, at stage 506, the method 500 determines which artifacts are due to the PWM noise 132. The method 500 may ignore some artifacts because they may include an appreciable Gaussian noise. For example, the method 500 may ignore the background image 401 due to a reduced number of artifacts (e.g., few measurable and/or detectable dark stripes). After the method 500 determines which artifacts are due to the PWM noise 132, at stage 508, the method 500 creates a PWM noise vector for each artifact (e.g., 401-410). As is illustrated in FIGS. 3 to 5, since the artifacts of the background images are striped, a horizontal portion of the PWM noise 132 is constant. As such, the method 500 may utilize one-dimensional (instead of two-dimensional) PWM noise vectors. The use of the one-dimensional vectors enables the noise-filtering algorithm to use limited hardware and/or memory resources (e.g., CRM 108) and utilize relatively few computational resources (e.g., application processor 106). Mathematically, the method 500 may express the PWM noise vector as a matrix denoted herein [PCA_PWM]. These principal component vectors may be stored and accessed in the future.

At stage 510, the method 500 illuminates, with light from the display screen 112, a user touch (e.g., touch area 122-1). The illumination causes the light to reflect off a user's skin. At stage 512, then, the method 500 captures the reflected light at the UDFPS 122 to provide a user-associated image (e.g., captured fingerprint image 130). At the stage 512, however, the captured fingerprint image 130 is an unfiltered fingerprint image and includes the PWM noise 132. In addition to the artifacts (e.g., dark stripes) of the PWM noise 132, the captured fingerprint image 130 has a reduced signal-to-noise ratio (SNR), further reducing a quality of the captured fingerprint image 130. In FIG. 5, the reduced SNR in the captured fingerprint image 130 is illustrated as a lighter shade of grey of the patterns and/or minutiae compared to the filtered fingerprint image 134.

At stage 514, the method 500 projects the user-associated image (e.g., captured fingerprint image 130) onto a vector space, where the vector space is associated with the PWM noise vector (e.g., 132, [PCA_PWM]). Projecting the user-associated image may include multiplying the PWM noise vector, a transpose of the PWM noise vector matrix, and a vectorized form of the captured fingerprint image 130. Mathematically, the stage 514 of the method 500 may be expressed using Equation 1:

$$[I_{PCA\_PWM}] = [PCA\_PWM] \cdot [PCA\_PWM]^T \cdot [I_{Captured}] \quad \text{Equation 1}$$

where a [PCA_PWM] matrix denotes the PWM noise vector, a $[PCA\_PWM]^T$ denotes a transpose of the [PCA_PWM] matrix, an $[I_{Captured}]$ matrix denotes a vectorized form of the captured fingerprint image 130, and a $[I_{PCA\_PWM}]$ matrix denotes the user-associated image (e.g., the captured fingerprint image 130) projected onto the vector space of the PWM noise.

At stage 516, based on the user-associated image projected onto the vector space of the PWM noise, the method 500 filters out the PWM noise 132 from the user-associated image (e.g., captured fingerprint image 130) to provide a reduced-noise image (e.g., filtered fingerprint image 134). Filtering out the PWM noise 132 may subtract the user-associated image on the vector space from the PWM noise vector. Mathematically, the stage 516 of the method 500 may be expressed using Equation 2:

$$[I_{Filtered}] = [I_{Captured}] - [I_{PCA\_PWM}] \quad \text{Equation 2}$$

where an $[I_{Filtered}]$ matrix denotes a vectorized form of the filtered fingerprint image 134.

Patterns and Minutiae

FIG. 6 illustrates examples of patterns (602, 604, and 606) and minutiae (610 through 626) used in matching fingerprints. The analysis of fingerprints for matching purposes generally requires the comparison of patterns and/or minutiae. The method 500 lowers the false acceptance rate, consequently improving the biometric security of the electronic device 102. The method 500 also lowers the false rejection rate, thereby providing a better user experience.

The three main patterns of fingerprint ridges are an arch 602, a loop 604, and a whorl 606. The arch 602 is a fingerprint ridge that enters from one side of the finger, rises in the center, forming an arc, and then exits the other side of the finger. The loop 604 is a fingerprint ridge that enters from one side of the finger, forms a curve, and then exits on that same side of the finger. The whorl 606 is a fingerprint ridge that is circular around a central point. The minutiae 610 through 626 are features of fingerprint ridges, such as ridge ending 610, bifurcation 612, short ridge 614, dot 616, bridge 618, break 620, spur 622, island 624, double bifurcation 626, delta 628, trifurcation 630, lake or ridge enclosure (not illustrated), core (not illustrated), and so forth.

For example, presence of artifacts in the captured fingerprint image 130 (e.g., verify image), due to the PWM noise 132, may appear as "valleys" in the verify image. Therefore, an electronic device may falsely reject a user when comparing the verify image to the enrolled image. The electronic device 102, however, uses the method 500 and the techniques described in FIGS. 1 to 5 to filter out the artifacts that may erroneously appear as "valleys" in a fingerprint image.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

EXAMPLE 1

A computer-implemented method comprising: performing a principal component analysis on background images associated with a sensor embedded under a display screen of a display system, the principal component analysis providing an artifact on the background images; extracting principal component vectors from the artifact; responsive to the extracting and based on the principal component vectors, determining at least one pulse-width modulated, PWM, noise; responsive to determining the PWM noise, vectorizing the PWM noise to create a PWM noise vector; illuminating, with light from the display screen, a user touch, the illumination to cause the light to reflect off a user's skin; capturing reflected light at the sensor to provide a user-associated image; projecting the user-associated image onto a vector space, the vector space being associated with the PWM noise vector to provide the user-associated image on the vector space; and based on the user-associated image on the vector space, filtering out the PWM noise from the user-associated image to provide a reduced-noise image.

EXAMPLE 2

The computer-implemented method of example 1, further comprising, based on the PWM noise vector, creating a first matrix of the PWM noise, and creating, based on the user-associated image, a second matrix, and wherein projecting the user-associated image multiplies the first matrix, a transpose of the first matrix, and the second matrix.

EXAMPLE 3

The computer-implemented method of example 2, wherein filtering out the PWM noise subtracts, from the second matrix, the user-associated image on the vector space.

EXAMPLE 4

The computer-implemented method of at least one of the examples 1 to 3, further comprising authenticating the user based on the reduced-noise image.

EXAMPLE 5

The computer-implemented method of example 4, further comprising, responsive to authenticating the user, enabling use of a function, account, or peripheral.

EXAMPLE 6

The computer-implemented method of at least one of the examples 1 to 5, wherein the vectorizing the PWM noise (132) to create a PWM noise vector is based on variable frequency in PWM noise; and a quantity of PWM noise vectors corresponds to a quantity of frequencies in PWM noise.

EXAMPLE 7

The computer-implemented method of at least one of the examples 1 to 6, wherein the vectorizing the PWM noise (132) to create a PWM noise vector is based on variations in one or more duty cycles of the display system (110); and a quantity of PWM noise vectors corresponds to a quantity of duty cycles of the display system (110).

EXAMPLE 8

The computer-implemented method of at least one of the examples 1 to 7, wherein the sensor may capture multiple images of a non-transparent, flat surface without the user-associated image.

EXAMPLE 9

The computer-implemented method of example 8, wherein the non-transparent flat surface is white.

EXAMPLE 10

The computer-implemented method of at least one of the examples 1 to 9, wherein determining the PWM noise further comprises capturing multiple background images by simulating clock jitter to induce the PWM noise.

EXAMPLE 11

The computer-implemented method of at least one of the examples 1 to 10, wherein the PWM noise is identified, modeled and/or estimated by the electronic device to capture the at least one background image by varying and/or simulating clock jitter, frequency shifts, amplitude variations, and/or other parameters inducing the PWM noise.

EXAMPLE 12

The computer-implemented method of example 10 or 11, further comprising determining amplitude variations in the PWM noise.

EXAMPLE 13

The computer-implemented method of at least one of the examples 1 to 12, wherein the artifact comprises a fingerprint image generated from a thumb, fingertip, or plurality of fingertips.

EXAMPLE 14

The computer-implemented method of at least one of the examples 1 to 13, wherein the background image is a captured image of a non-transparent flat surface of a fingerprint identification system.

EXAMPLE 15

The computer-implemented method of at least one of the examples 1 to 14, wherein capturing reflected light at the sensor to provide a user-associated image comprises a vertical display rolling shutter scheme.

EXAMPLE 16

The computer-implemented method of at least one of the examples 1 to 14, wherein capturing reflected light at the sensor to provide a user-associated image comprises a horizontal display rolling shutter scheme.

EXAMPLE 17

The computer-implemented method of example 15 or 16, wherein a first PWM signal turns on pixels of the display row(s) during more than 70%, in particular more than 80% of the time, and turns off pixels of the display row(s) during less than 30%, in particular less than 20% and a second PWM signal turns on pixels of the display row(s) during more than 90%, in particular more than 95% of the time, and turns off pixels of the display row(s) during less than 10%, in particular less than 5%.

EXAMPLE 18

A user device comprising: a display system comprising: a display screen; and a pulse-width modulation circuit; a sensor; one or more processors; and one or more computer-readable media having instructions thereon that, responsive to execution by the one or more processors, perform operations of the computer-implemented method of any of examples 1 to 17.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
performing a principal component analysis on one or more background images associated with a sensor embedded under a display screen of a display system, the principal component analysis effective to reveal an artifact associated with pulse-width modulated (PWM) noise in the one or more background images;
determining PWM noise based at least in part on an extraction of principal component vectors from the artifact associated with PWM noise in the one or more background images;
responsive to determining the PWM noise, vectorizing the PWM noise to create a PWM noise vector;
illuminating, with light emitted from the display system, a user touch at the display screen, the illumination effective to produce a reflection of light associated with skin of a user;
capturing the reflection of light at the sensor to provide a user-associated image;
projecting the user-associated image onto a vector space, the vector space being associated with the PWM noise vector to provide the user-associated image on the vector space; and
based on the user-associated image on the vector space, filtering out the PWM noise from the user-associated image to provide a reduced-noise image.

2. The method of claim 1, further comprising:
based on the PWM noise vector, creating a first matrix of the PWM noise, and creating, based on the user-associated image, a second matrix, and wherein projecting the user-associated image multiplies the first matrix, a transpose of the first matrix, and the second matrix.

3. The method of claim 2, wherein filtering out the PWM noise subtracts, from the second matrix, the user-associated image on the vector space.

4. The method of claim 1, further comprising:
authenticating the user based on the reduced-noise image.

5. The method of claim 4, further comprising:
responsive to authenticating the user, enabling use of a function, account, or peripheral.

6. The method of claim 1, wherein the vectorizing the PWM noise to create a PWM noise vector, vectorizes two or more frequencies in the PWM noise; and
a quantity of PWM noise vectors corresponds to a number of the two or more frequencies of PWM noise.

7. The method of claim 1, wherein the vectorizing the PWM noise to create a PWM noise vector is based on variations in one or more duty cycles of the display system; and
a quantity of PWM noise vectors corresponds to a quantity of the variations in the one or more duty cycles of the display system.

8. The method of claim 1, wherein the sensor captures multiple images of a non-transparent, flat surface without the user-associated image.

9. The method of claim 8, wherein the non-transparent flat surface is white.

10. The method of claim 1, wherein determining the PWM noise further comprises capturing multiple background images by simulating clock jitter to induce the PWM noise.

11. The method of claim 10, wherein the PWM noise is identified, modeled and/or estimated by the electronic device to capture the at least one background image by varying and/or simulating clock jitter, frequency shifts, amplitude variations, and/or other parameters inducing the PWM noise.

12. The method of claim 10, further comprising:
determining amplitude variations in the PWM noise.

13. The method of claim 1, wherein the artifact comprises a fingerprint image generated from a thumb, fingertip, or plurality of fingertips.

14. The method of claim 1, wherein the one or more background images are captured images of a non-transparent flat surface of a fingerprint identification system.

15. The method of claim 1, wherein capturing reflected light at the sensor to provide a user-associated image comprises a vertical display rolling shutter scheme.

16. The method of claim 1, wherein capturing reflected light at the sensor to provide a user-associated image comprises a horizontal display rolling shutter scheme.

17. The method of claim 16, wherein:
a first PWM signal turns on pixels of the display row(s) during more than 70% of the time and turns off pixels of the display row(s) during less than 30%; and
a second PWM signal turns on pixels of the display row(s) during more than 90% of the time and turns off pixels of the display row(s) during less than 10%.

18. A user device comprising:
a display system comprising:
 a display screen; and
 a pulse-width modulation circuit;
a sensor embedded under the display screen;
one or more processors; and
one or more computer-readable media having instructions thereon that, responsive to execution by the one or more processors, are configured to:
 perform a principal component analysis on one or more background images associated with the sensor embedded under the display screen of the display system, the principal component analysis effective to reveal an artifact associated with pulse-width modulated (PWM) noise in the one or more background images;
 determine PWM noise based at least in part on an extraction of principal component vectors from the artifact associated with PWM noise in the one or more background images;
 responsive to the determination the PWM noise, vectorize the PWM noise to create a PWM noise vector;
 illuminate, with light emitted from the display system, a user touch at the display screen, the illumination effective to produce a reflection of light associated with skin of a user;
 capture the reflection of light at the sensor to provide a user-associated image;
 project the user-associated image onto a vector space, the vector space being associated with the PWM noise vector to provide the user-associated image on the vector space; and
 based on the user-associated image on the vector space, filter out the PWM noise from the user-associated image to provide a reduced-noise image.

19. The user device of claim 18, wherein the sensor captures multiple images of a non-transparent, flat surface without the user-associated image.

20. The user device of claim 18, wherein the one or more computer-readable media having instructions thereon that, responsive to execution by the one or more processors, are further configured to:
authenticate the user based on the reduced-noise image; and
responsive to authenticating the user, enable use of a function, account, or peripheral.

* * * * *